United States Patent [19]

Pilcher

[11] 4,017,094
[45] Apr. 12, 1977

[54] STEERING CONVERTER APPARATUS

[76] Inventor: Robert Dwayne Pilcher, 1220 S. Utica, Denver, Colo. 80219

[22] Filed: Oct. 16, 1975

[21] Appl. No.: 622,849

[52] U.S. Cl. .............................. 280/404; 280/81 B; 280/442
[51] Int. Cl.$^2$ .......................................... B60P 3/40
[58] Field of Search .......... 280/419, 426, 442, 443, 280/444, 404, 81 B, 81 R

[56] References Cited

UNITED STATES PATENTS

| 2,520,776 | 8/1950 | Page | 280/404 |
|---|---|---|---|
| 3,087,744 | 4/1963 | Tanenbaum | 280/404 |
| 3,102,735 | 9/1963 | Bigge | 280/426 X |
| 3,430,987 | 3/1969 | Whitmire et al. | 280/404 |
| 3,591,200 | 7/1971 | Van Raden | 280/404 X |

FOREIGN PATENTS OR APPLICATIONS

| 547,810 | 10/1922 | France | 280/426 |

*Primary Examiner*—Joseph F. Peters, Jr.
*Assistant Examiner*—John A. Pekar

[57] ABSTRACT

The total apparatus for transporting long loads includes a tractor, a first steering converter trailer truck, and a second load-bearing trailer truck. Forward and aft bolsters are mounted on the tractor and the second truck for rotation about vertical axes to support the load and be tied to it. The first truck has a steering converter coupler with a terminal at its forward end engaged with a pivotal connector on the tractor located well aft of the bolster pivot. The second truck has a follower coupler with its forward end pivotally connected to the first truck, which does not contact the load and is free to move to either side. Lateral movement of the pivotal connector when the tractor turns directs the first truck to the outside of the curve away from the centerline of the load and the second truck follows it. The outboard position of the first truck counteracts any tipping tendency on a fast turn. Both trucks tend to follow closely in the path of the tractor, which avoids "corner cutting" and enables the tractor to negotiate turns of much smaller radius than would otherwise be possible.

13 Claims, 13 Drawing Figures

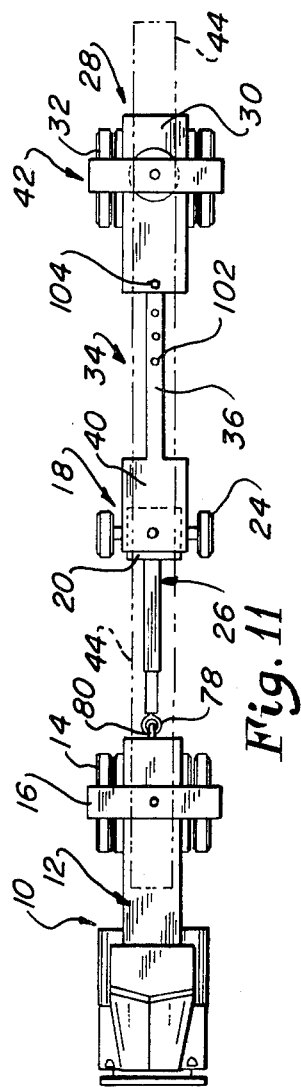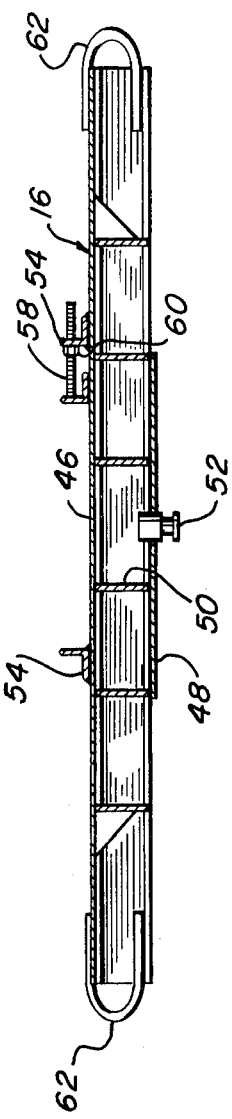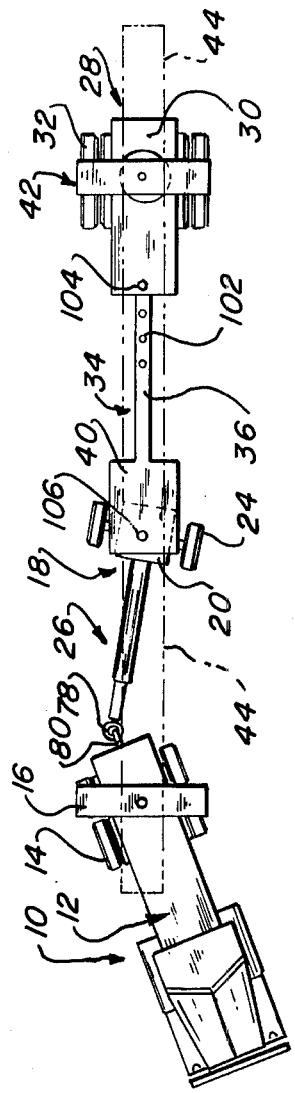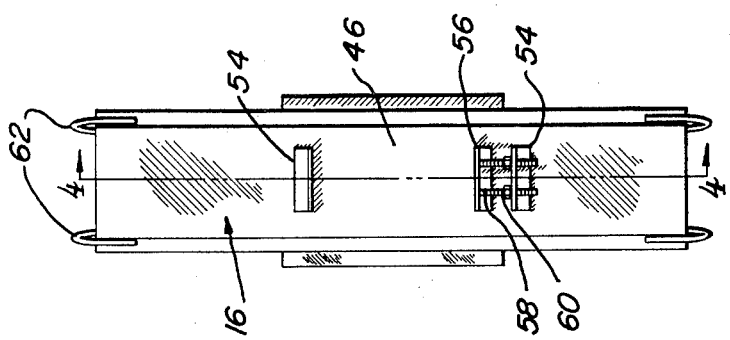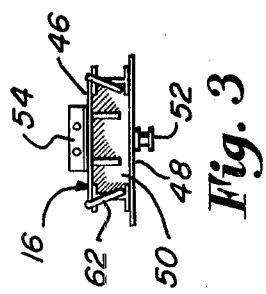

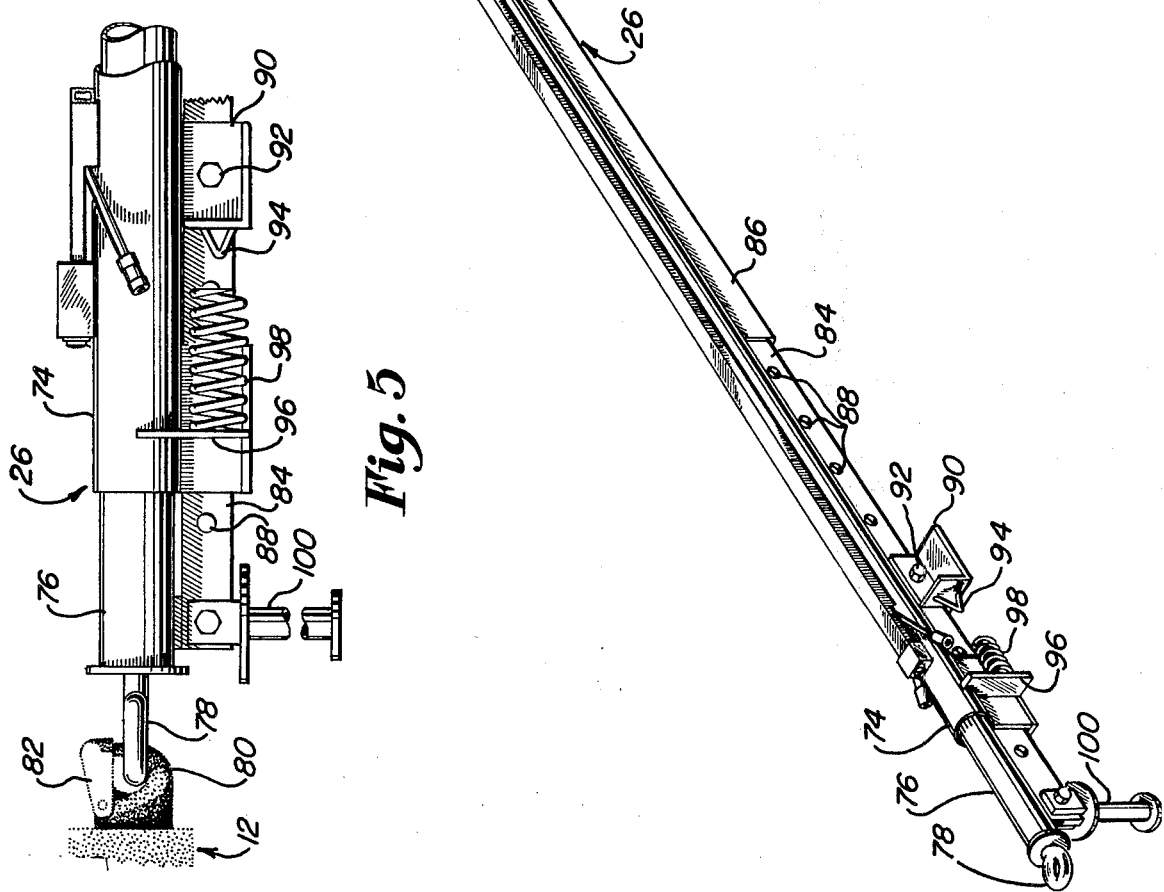

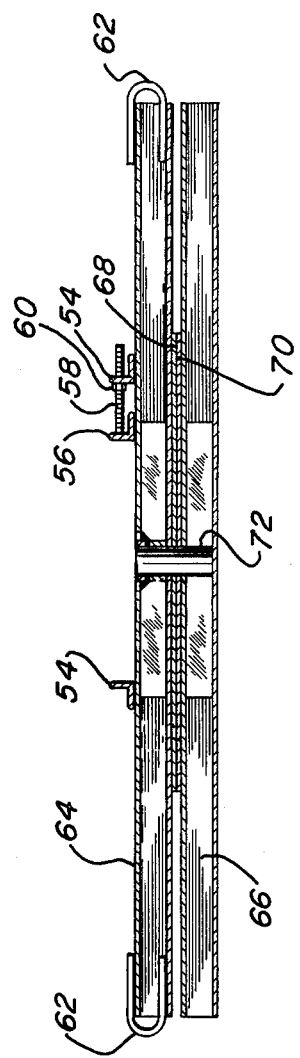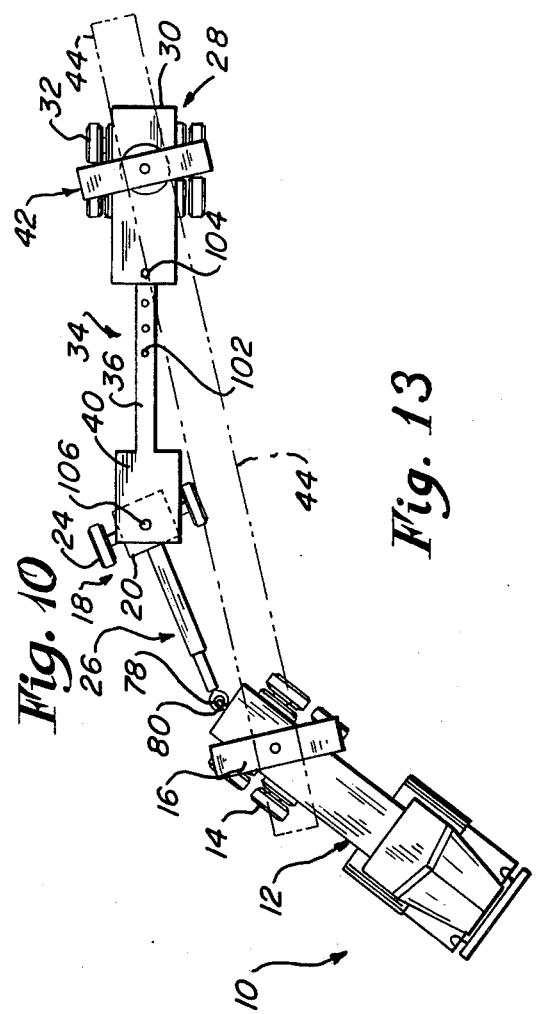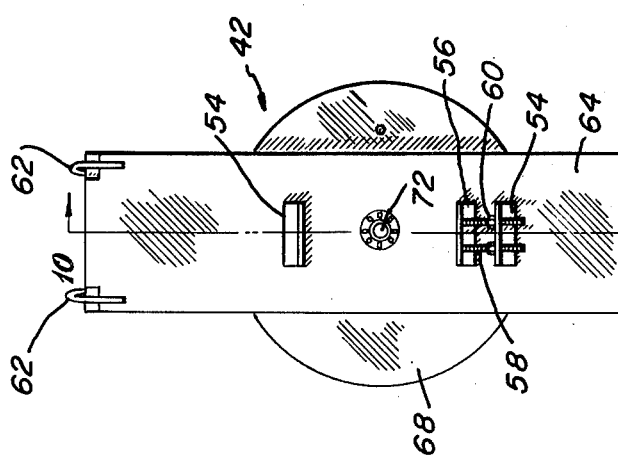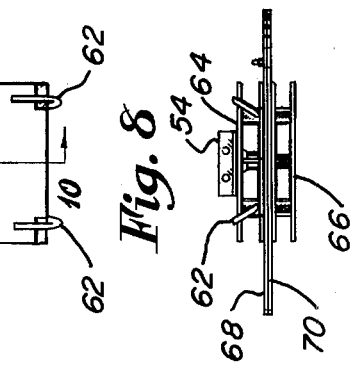

STEERING CONVERTER APPARATUS

BACKGROUND OF THE INVENTION

This invention lies in the field of apparatus for transporting long loads and is directed to tractor-trailer combinations with improved steering arrangements. It is more particularly directed to such apparatus in which the steering arrangement provides protection against tipping on a fast turn and enables the tractor to negotiate turns of much smaller radius than would otherwise be possible.

Modern construction techniques frequently call for the use of very long beams of steel or reinforced concrete to serve as bridge spans or roof supports in various types of buildings. These beams may be from 50 to 90 feet in length. Reinforcing bars for on-site concrete construction may also be of comparable length. The problem of transportation of such material from a fabrication or storage location to a construction site requires special vehicles.

Probably the most generally used vehicle comprises a conventional tractor having a "fifth wheel" mount over its driving wheels and a flat bed trailer having a load bearing truck under its aft portion and a pin at its forward end for pivotal connection to the fifth wheel mount on the tractor. The load is laid directly on the bed and may overhang the aft end by several feet. The distance between the tractor driving wheels and the trailer truck is short enough to allow the total rig to negotiate reasonably sharp turns. However if the length is increased the wheel distance is also increased and maneuverability drops off rapidly so that the vehicle is not suitable for handling loads much beyond about 40 feet.

Articulated trailers having two flat beds in tandem connected on a vertical pivot axis and with trucks under each constitute an improvement but they are still unsatisfactory because the first and second trailer each travel on successively shorter radius curves than the tractor and therefore cut corners or jump curbs at typical intersections.

In another type, the aft end of the trailer bed is mounted on a truck having tandem axles spaced longitudinally a considerable distance apart with a vertical pivot connection between the bed and the truck with its axis between the forward and aft axles. A steering linkage connects the forward axle to an intermediate point of the bed and, as the bed follows the tractor around a turn, it steers the forward wheels toward the inside of the turn. The result is that both sets of wheels describe a much tighter turn and the corner cutting is even more severe.

In a variation of the type just described, the aft portion of the bed is similarly pivoted on a truck with well spaced tandem wheels, the forward wheels being non-pivoted and the rear wheels being steerable. A tongue fixedly connected to the forward end of the truck is pivotally secured to a pivot mounting at the aft end of the tractor. Lateral movement of the pivot mounting as the tractor goes into a turn tends to swing the truck toward the outside of the turn, which is desirable, but the pivotal connection to the bed requires the wheels of the forward and aft axles to swing laterally in opposite directions which would drag the wheels across the surface and generate a great deal of resistance and tire scraping. As the bed follows the tractor around a turn it swings slightly inward and steers the rear wheels toward the outside of the turn. This causes the truck wheels to follow fairly closely the path of the tractor but does not alleviate the expensive tire wear.

The two types last described are basically close coupled and have standard trailer beds, and consequently they are not suitable for truly long loads ranging from 50 to 90 feet in length. Another type which has been proposed is designed specifically for long loads. In this type, a rather short trailer bed is mounted on two longitudinally spaced trucks, each with tandem axles. It is fixedly attached to the rear truck and connected at its forward end to the forward truck by a vertical pivotal mount. A bolster is mounted on the bed at an intermediate location for rotation about a vertical axis. A long towing tongue is fixedly connected to the forward end of the forward truck and pivotally connected to the fifth wheel on the tractor. A second bolster is also pivotally mounted on the fifth wheel. The long load is laid on the two bolsters which support it at or near its two ends. When the tractor travels around a turn the forward truck follows it on a smaller radius and the aft truck follows the forward truck on a still smaller radius, with the bolsters turning on their pivots to allow the load to ride at an angle to the tractor and both trucks. Although this construction is well suited to carry long loads it does not solve the problem of corner cutting which is only aggravated by the extreme overall length of the apparatus.

SUMMARY OF THE INVENTION

The apparatus of the present invention overcomes the difficulties mentioned above and provides a relatively simple and reliable system for mounting and transporting long loads which provides easy handling for the driver and permits him to negotiate much tighter turns than would otherwise be possible without cutting corners. While corner cutting in open ground around a construction site ordinarily would be immaterial it presents a serious problem at intersections on streets and highways.

Generally stated, the apparatus includes a tractor, a first steering converter trailer truck, and a second load-bearing trailer truck. The tractor is provided with a forward bolster mounted on the standard fifth wheel for rotation about a vertical axis and also with a pivotal connector located well aft of the bolster pivot.

The first truck is provided with a steering converter coupler fixedly secured thereto and extending forward and having a terminal at its forward end engaged with the pivotal connector on the tractor. It is also provided with a pivot mount.

The second truck is provided with a follower coupler fixedly secured thereto and having a pin at its forward end engaged with the pivot mount on the first truck to provide for relative rotation about a vertical axis. An aft bolster is mounted on the second truck for rotation about a vertical axis located between the two axles on which the truck is supported.

With the three components connected, a long load is set in position with its end portions lying on the two bolsters and tied down securely to prevent any significant fore and aft movement with respect to either bolster.

The first truck is provided with a single axle and the pivot mount is preferably directly above the axle so that the axle can readily rotate about its center point. The uppermost portion of the first truck and its connection with the follower coupler is spaced below the load so that there is no direct connection between them and the first truck does not carry any portion of the load itself. Therefore it is free to swing laterally in either direction under the influence of its connection with the tractor. The effective length of the steering converter coupler is freely variable within predetermined limits so that the first truck can swing away from the centerline of the load, and the towing force of the tractor is not transmitted through the coupler but rather through the load itself to the second truck. The follower coupler then exerts a pushing force against the first truck.

In operation, when the tractor enters a turn, its pivotal connector swings laterally toward the outside of the turn because of its location well back of the axle or axles of the driving wheels. In turn, it swings the forward end of the steering converter coupler in the same direction and thus directs the first truck toward the outside of the turn. The truck continues outward until the coupler is extended as far as it is allowed to go and then follows the general path of the tractor at about the same radius, therefore eliminating corner cutting. Also it is now spaced laterally from the load to the outside so that it serves to resist any tipping tendency resulting from a fast turn. The second truck is drawn out toward the same path by its connection to the first truck. All of the weight of the load is carried by the tractor and the second truck, and the first truck is free to serve only as a steering device.

BRIEF DESCRIPTION OF THE DRAWINGS

Various other advantages and features of novelty will become apparent as the description proceeds in conjunction with the accompanying drawings, in which:

FIG. 2 is a top plan view of the bolster mounted on the tractor;

FIG. 3 is an end view of the bolster of FIG. 2;

FIG. 4 is a sectional view taken on line 4—4 of FIG. 2;

FIG. 5 is a partial side elevational view of the steering converter coupler engaged with the pivotal connector;

FIG. 6 is a perspective view of the steering converter trailer truck with its coupler;

FIG. 7 is a partial plan view of the forward portion of the steering converter coupler;

FIG. 8 is a top plan view of the bolster turntable combination mounted on the load-bearing trailer truck;

FIG. 9 is an end view of the combination of FIG. 8;

FIG. 10 is a sectional view taken on line 10—10 of FIG. 8;

FIG. 11 is a diagrammatic plan view of the total apparatus traveling on a straight line path;

FIG. 12 is a view similar to FIG. 11 showing the apparatus at the beginning of a turn; and FIG. 13 is a view similar to FIG. 11 showing the apparatus in the course of a turn.

DESCRIPTION OF PREFERRED EMBODIMENTS

Figure 1:
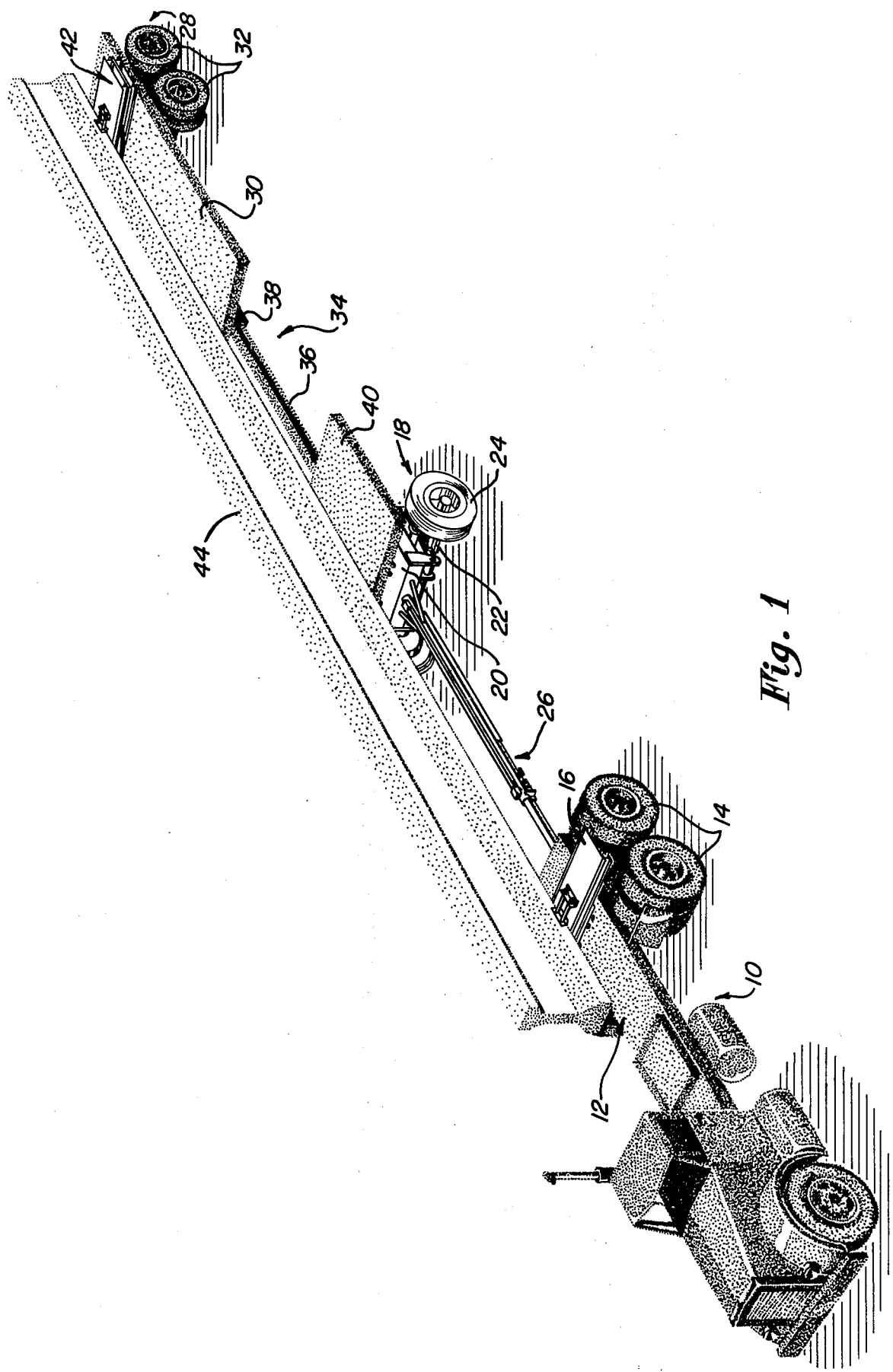
FIG. 1 is a perspective view of the apparatus carrying a typical long load.

A typical arrangement of a transport apparatus incorporating the features of the invention is illustrated in FIG. 1, in which a substantially standard tractor 10 is provided with a rear platform 12 connected to a set of dual tandem road wheels 14 with the cross axles longitudinally spaced. A bolster 16 is mounted on a standard fifth wheel mount, not shown, for rotation about a vertical axis located between the axles of the driving wheels.

A first steering converter trailer truck 18 has a platform 20 beneath which is mounted a single axle 22 having road wheels 24. A steering converter coupler 26 is fixedly secured to the platform and its front end bears a terminal engaging a pivotal connector carried by platform 12 of the tractor.

A second load-bearing trailer truck 28 includes a platform 30 supported by a pair of longitudinally spaced tandem axles, not shown, having dual road wheels 32. A follower coupler 34 includes an elongate shank 36 slidable in socket 38 on the underside of platform 30 to adjust its length and lockable in selected position. The forward end of the shank is provided with a platform 40 having a pin, not shown, for connection to a fifth wheel pivot mount centered on platform 20 for rotation about a vertical axis preferably passing through axle 22. A bolster-turntable combination 42 is secured to platform 30, with its upper portion rotatable about a vertical axis located between the tandem axles of the second truck. A typical long load 44, here indicated as a reinforced concrete beam, is mounted nears its ends on the forward and aft bolsters.

The forward bolster 16 is illustrated in FIGS. 2, 3, and 4. It consists basically of an upper rectangular plate 46 and a lower rectangular plate 48 joined by welded bracing 50 to provide a box beam. A standard pivot pin 52 extends downward from plate 48 to engage the pivot socket of the fifth wheel pivot mounting on the tractor platform 12. The load is centered and held against lateral displacement by stationary brackets 54 and adjustable bracket 56, connected to one of the brackets 54 and adjusted by threaded rods 58 and nuts 60. The brackets 54 are bolted to plate 46 and may be set in different positions to accommodate loads having different widths. Eyes 62, bent to shape and welded to the ends of the bolster, serve as anchors for tie-down members, not shown, which restrain the load against longitudinal movement with respect to the bolster.

The aft bolster-turntable combination 42 comprises substantially identical upper and lower braced rectangular box beams 64 and 66 and upper and lower turntable disks 68 and 70. The lower beam 66 is bolted to platform 30 and disk 70 is secured thereto. Disk 68 is secured to beam 64 and is in rotatable contact with disk 70. A vertical pivot pin 72 secures the components in assembled relation for rotation of upper beam 64 about a vertical axis which is located between the longitudinally spaced tandem axles of second truck 28. The same components as described with reference to the forward bolster are used to secure the load.

The details of the steering converter trailer truck and its coupler are shown in FIGS. 5, 6, and 7. The truck itself has already been described. Coupler 26 basically comprises a first elongate shank 74 in the form of a rigid tube fixedly secured to platform 20 and extending forward therefrom and a second elongate shank 76 longitudinally slidably connected to shank 74 and in preferred form telescoping therein. A terminal 78 in the form of an eye is rigidly connected to the forward end of shank 76 and is adapted to be engaged with pivotal connector 80 in the form of a hook secured to the aft end of platform 12 of the tractor, the hook being provided with a pivoted locking shield 82, as shown in FIG. 5.

The extent to which truck 18 will swing to the outside of the turn is governed by the extension of shank 76 from shank 74. The amount of such extension is predetermined to obtain the desired tracking and this is controlled by the use of suitable stops. As best seen in FIGS. 5 and 6, a gauge bar 84 is secured to the lower side of shank 76 and extends aft and slidably within sheath 86. It is provided with a plurality of spaced apertures 88 to one of which an adjustable stop 90 is fastened by means of bolt 92, the proper aperture being selected to permit the desired runout. A piece of bent rod 94 is welded to the stop to serve as an abutment. A fixed stop 96 is welded to shank 74 and carries a resilient bumper member in the form of a coil spring 98 to engage abutment 94 and cushion the shock of the extension movement. While single stops may be used they are preferably provided in duplicate as shown. Pivot pin 100 depends from the forward end of shank 76 and is used for attachment to the fifth wheel of a tractor when truck 18 is to be towed "out of service" to or from a location where it is used in the combination which constitutes the invention.

To set the apparatus up for use, the first and second trucks are pivotally connected, terminal eye 78 is attached to pivotal connector or hook 80, and the trucks are moved forward until shank 76 is practically fully retracted into shank 74 as generally indicated in FIGS. 5 and 6. Truck 18 is now blocked in position and truck 28 is moved rearward to a predetermined position to accept the load. This is accomplished by extending coupler 34. Shank 36 of the coupler is provided with a plurality of adjustment apertures 102 and a bolt or pin 104 which passes through an aperture in platform 30 and its socket 38 and through one of apertures 102. When the bolt is removed, truck 28 is moved to a suitable position, and bolt 104 is passed through a registering aperture to lock the coupler at the desired adjusted length.

The operation of the apparatus is illustrated in FIGS. 11, 12, and 13. In FIG. 11, the tractor is moving forward in a straight line relation. The first truck 18 does not carry the load and the towing force of the tractor is transmitted in tension through load 44, which is firmly secured to the bolsters, to the second truck 28. The force is then transmitted through coupler 34 to the first truck to push it forward. Consequently there is no tension load in coupler 26 and the first truck is free to swing laterally under the influence of pivotal connector 80.

In FIG. 12 the truck has initiated a turn and the effective rotation of the platform about the vertical axis between its tandem axles has caused connector 80 to swing laterally toward the outside of the turn, carrying with it terminal 78. This action directs truck 18 toward the outside of the turn and, as it does so, coupler 26 extends to a greater effective length. The follower coupler 34 is guided outward by truck 18 so that truck 28 is gradually turned to the outside and both trucks will follow the general path of the tractor.

This becomes apparent in FIG. 13 where the apparatus is shown in mid course in a turn. Truck 18 has swung out until coupler 26 has extended as far as permitted by the stops which have been pre-set, and the truck has moved laterally completely away from the load. In this position it affords protection against any tipping tendency which may be produced by a fast turn. Moreover both trucks are continually directed toward the outside of the turn to follow generally in the path of the tractor. The important result is that the driver may take the truck around almost any turn that the truck could negotiate alone without corner cutting or curb jumping by the trailer trucks. Since the vertical axis 106 of the pivot mounting 108 on the first truck is directly over the single axle 22, and the truck is free of direct contact with the load it can pivot directly about such axis and follow the control of connector 80 very precisely.

The platform 40 carries on its under side a pivot pin, not shown but basically the same as pin 52 on bolster 16, for the purpose of attachment to pivot mounting 108 on truck 18. It can be similarly attached to the fifth wheel mount on any tractor, and truck 28 with platforms 30 and 40 can then serve as a flat bed trailer when not being used for the purposes of the present invention.

what is claimed is:

1. Apparatus for transporting long loads comprising:
   a tractor having a body, rear driving wheels, and forward steerable wheels, a first steering converter trailer truck provided with road wheels, and a second load-bearing trailer truck provided with road wheels;
   a forward bolster mounted on the tractor body for rotation about a vertical axis and constructed and arranged to support and be secured to the forward portion of a long load;
   the second truck being located well aft of the tractor and provided with an aft bolster mounted thereon for rotation about a vertical axis and constructed and arranged to support and be secured to the aft portion of a long load;
   the tractor and the second truck serving to take the entire weight of the load with the latter serving as the draft hitch between the tractor and the second truck;
   the first steering converter truck being located at an intermediate position between the tractor and the second truck independently of the load and of the aft bolster, and bearing no part of the weight thereof;
   a pivot mount on the first truck;
   an elongate follower coupler secured to the second truck in non-load-bearing position independently of the aft bolster and extending forward from the second truck with its forward end connected to the pivot mount for rotation;
   a pivotal connector secured to a fixed part of the tractor body independent of the bolster and at a point spaced aft of the pivotal axis of the bolster;
   and a steering converter coupler secured to the first truck and extending forward therefrom with its forward end pivotally connected to the connector on the tractor;
   the first truck being free to swing laterally independently of the load and adapted to be directed by the lateral movement of the pivotal connector, in response to turning movement of the tractor, toward the outside of the curve to increase the turning radius of the first truck.

2. Apparatus as claimed in claim 1; in which the effective length of at least one of the couplers is freely variable within predetermined limits during transport to provide a predetermined extent of departure of the first truck from the longitudinal centerline of the load.

3. Apparatus as claimed in claim 2; in which the effective length of the steering converter coupler is variable during transport and the length of the follower coupler is fixed during transport.

4. Apparatus as claimed in claim 3; in which the follower coupler is adjustable in length when the apparatus is stationary, and is lockable at any selected length.

5. Apparatus as claimed in claim 4; in which the second truck is provided with a longitudinally extending socket;

the follower coupler includes an elongate shank slidable in the socket;

and locking means engages the socket and the shank.

6. Apparatus as claimed in claim 1; in which the steering converter coupler includes a first elongate shank fixedly secured to the first truck and a second elongate shank longitudinally slidably connected to the first shank and having a terminal at its forward end to engage the pivotal connector on the tractor.

7. Apparatus as claimed in claim 6; in which the first elongate shank is a rigid tube and the second shank telescopes within the tube in sliding engagement therewith.

8. Apparatus as claimed in claim 6; in which the first shank is provided with a first fixed stop mounted on the forward portion thereof;

and the second shank is provided with a second stop adjustable to selected longitudinal positions along its forward portion and engageable with the first stop to limit extension of the second shank with respect to the first shank.

9. Apparatus as claimed in claim 8; in which one of the stops is provided with a resilient bumper member to contact the other stop and cushion the shock of maximum extension movement.

10. Apparatus as claimed in claim 1; in which the first truck is provided with a single axle to facilitate relatively sharp turning in response to lateral movement of the pivotal connector on the tractor.

11. Apparatus as claimed in claim 10; in which the pivot mount on the first truck is located substantially directly above the axle.

12. Apparatus as claimed in claim 1; in which the second truck is provided with two longitudinally spaced tandem axles;

and the vertical axis of rotation of the aft bolster is located between the axles.

13. Apparatus as claimed in claim 1; in which anchors are provided on the bolsters to receive tie-down members for securing the long load against longitudinal displacement with respect to either bolster and cause the towing force of the tractor to be transmitted through the load to the truck and thence through the follower coupler to push the first truck forward.

* * * * *